United States Patent [19]

Peters et al.

[11] Patent Number: 5,114,459
[45] Date of Patent: May 19, 1992

[54] STABILIZED TRACE ELEMENT FERTILIZER COMPOSITIONS AND METHOD OF THEIR USE

[75] Inventors: John R. Peters; Robert B. Peters, both of Allentown, Pa.

[73] Assignee: Grace Sierra Horticultural Products Co., Milpitas, Calif.

[21] Appl. No.: 551,429

[22] Filed: Jul. 10, 1990

[51] Int. Cl.⁵ .......................... C05C 5/00; C05G 1/00
[52] U.S. Cl. ........................................ 71/32; 71/58; 71/59; 71/64.1; 71/903
[58] Field of Search ............... 71/54, 58, 59, 60, 61, 71/903, 64.1, 1, 32

[56] References Cited

U.S. PATENT DOCUMENTS

| | | | |
|---|---|---|---|
| 3,503,733 | 3/1970 | Belasco et al. | 71/54 |
| 3,573,028 | 3/1971 | Ueno et al. | 71/61 |
| 4,552,581 | 11/1985 | Bremner | 71/903 |
| 4,781,748 | 11/1988 | Miller et al. | 71/59 |

FOREIGN PATENT DOCUMENTS 2572244  5/1986  France ...................... 71/64.1

Primary Examiner—Wayne A. Langel
Attorney, Agent, or Firm—Morrison & Foerster

[57] ABSTRACT

Method of enhancing the growth of plants in a soil or soil-like medium during a growing period is disclosed. The method comprises varying the ratio of ammoniacal nitrogen to nitrate nitrogen in a fertilizer composition in proportion to the amount of light available to the plant, while maintaining a constant ratio in the composition of the amount of trace elements to the total amount of nitrogen.

19 Claims, 1 Drawing Sheet

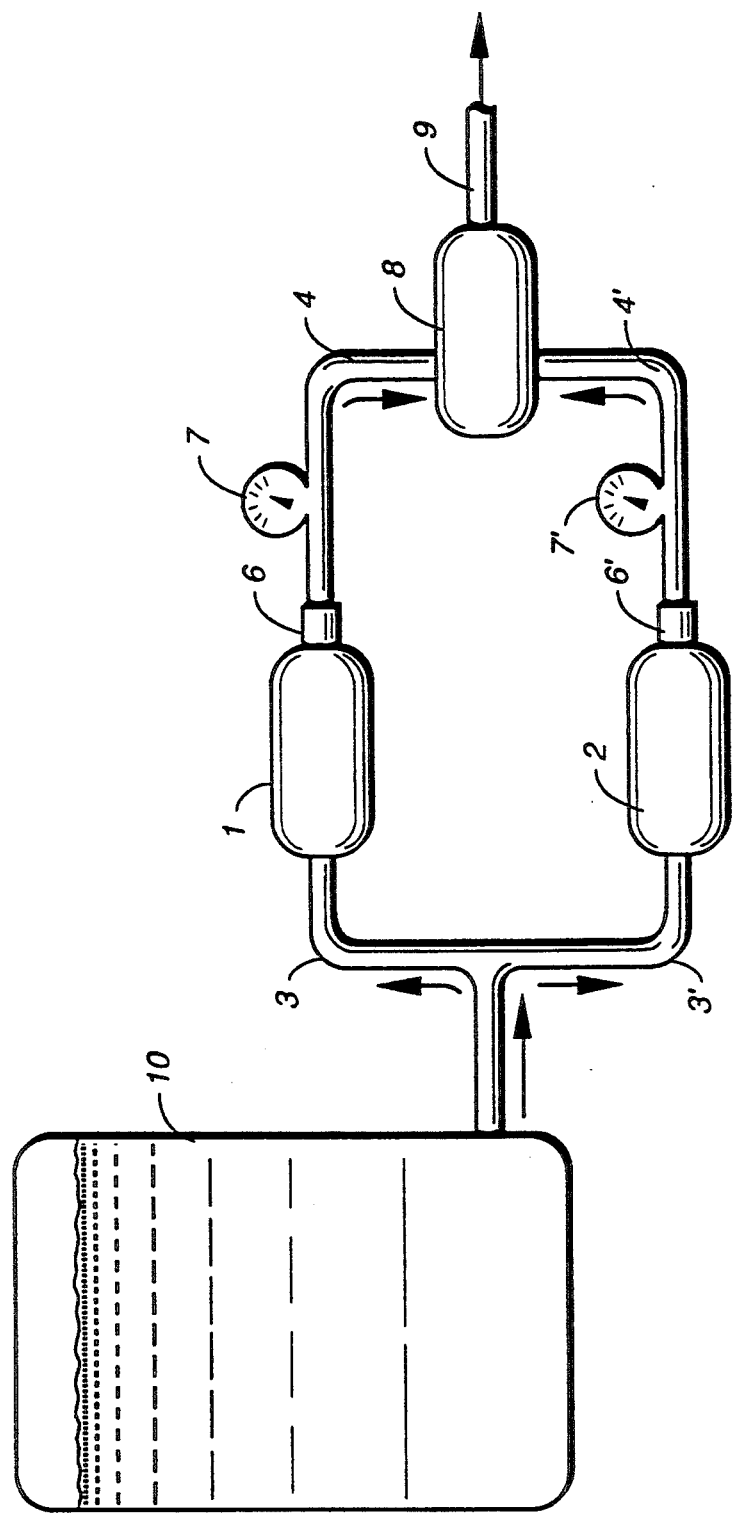
FIG._1

5,114,459

STABILIZED TRACE ELEMENT FERTILIZER COMPOSITIONS AND METHOD OF THEIR USE

FIELD OF THE INVENTION

The present invention relates generally to the field of methods of fertilization and fertilizer kits and compositions used in connection with such methods. More particularly, the invention relates to a method of fertilization which enhances plant growth by varying the ratio of ammoniacal nitrogen to nitrate nitrogen in a fertilizer composition in proportion to the amount of light available to the plant, while maintaining a constant ratio in the composition of trace elements to total nitrogen.

BACKGROUND OF THE INVENTION

The importance of fertilizers in the growth of plants has long been recognized. Chemical fertilizers may be generally divided into two basic classes: primary fertilizers, and secondary fertilizers which are commonly referred to as trace elements or micronutrients. The primary fertilizers are nitrogen, comprising ammoniacal and nitrate nitrogen, phosphorus and potassium. Most fertilizer compositions sold commercially today include primarily these three elements. Such fertilizer compositions are often referred to as NPK fertilizers. In many agricultural applications for field grown crops the primary fertilizers are the only chemical fertilizers in the fertilizer composition, as it is expected that the small quantities of trace minerals or micronutrients necessary will be available from the soil. In other agricultural applications calcium will be added to the three primary fertilizers.

In many parts of the United States, and the world, container culture of nursery and greenhouse plants is expanding rapidly. These container and greenhouse plants present different requirements for proper fertilization. In order to achieve proper moisture drainage, and therefore oxygen for root development and nutrient absorption, a wide assortment of organic and inorganic materials are used as components of the container growing medium. This container growing medium takes the place of soil in which garden-grown or field-grown plants are produced. The importance of trace elements to obtain proper fertilization of container-grown plants is known and the growth of plants is substantially enhanced by the inclusion of trace elements in the fertilizer (in addition to the primary fertilizers). These trace elements may include iron, manganese, copper, zinc, boron, and molybdenum.

The ratio of nitrate to ammoniacal nitrogen supplied to a greenhouse plant should be varied at different times during the growing cycle. However, earlier methods of varying this ratio have not been systematic or continuous, but somewhat random using the fertilizer products commercially available. Furthermore, in varying the ratio of nitrate to ammoniacal nitrogen in a random manner, the micronutrient levels supplied to the plant have also been varied haphazardly, such that the plant is subjected to non-optimal and often deleterious levels of these nutrients.

SUMMARY OF THE INVENTION

The present invention provides an improved fertilization method for enhancing the growth of plants. According to the invention, plant growth is enhanced by varying in a systematic and continuous manner the ratio of ammoniacal nitrogen to nitrate nitrogen in a fertilizer composition in proportion to the amount of light available to the plant, while maintaining a constant ratio in the composition of trace elements to total nitrogen. The systematic aspect of the present invention involves increasing the amount of one nitrogen containing fertilizer while simultaneously decreasing the amount of the other nitrogen containing fertilizer in ratios which are proportional to the amount of light available. The methodologies of the invention are carried out in a continuous fashion of gradually increasing the amount of one nitrogen containing fertilizer with respect to another (preferably on a day-by-day basis) as the amount of light available to the plant changes on a day-by-day basis during the growing season of the plant. Accordingly, the invention is both systematic and continuous with respect to varying the ratio of ammoniacal nitrogen to nitrate nitrogen in the fertilizer compositions applied to the plant in proportion to the amount of light available to the plant, while maintaining a constant ratio in the composition of trace elements to total nitrogen provided to the plant.

The invention is accordingly directed to a method of enhancing plant growth in a soil or soil-like growing medium, during a growing period, by periodically adding to the growing medium during said growing period a composition comprising ammoniacal nitrogen, nitrate nitrogen, and at least one trace element; and adjusting during the growing period the weight ratio of ammoniacal nitrogen to nitrate nitrogen in the fertilizer composition in direct proportion to the amount of light available to the plant, while maintaining constant in the composition the ratio of the total weight of ammoniacal nitrogen and nitrate nitrogen to the total weight of the trace element or elements in the fertilizer compositions.

In one embodiment of the invention, the adjustment of the ammoniacal to nitrate nitrogen is accomplished by blending two or more aqueous fertilizer solutions, each solution comprising a different ratio of ammoniacal to nitrate nitrogen but the same ratio of total nitrogen to trace elements present therein. The fertilizer solutions are blended in varying proportions at different times during the growing period to provide the fertilized plant with a preferred ratio of ammoniacal to nitrate nitrogen which is appropriate to the level of available light at that time.

In a preferred embodiment two or more aqueous solutions are employed, each comprising ammoniacal nitrogen, nitrate nitrogen, potassium and phosphorus as principal fertilizers and boron, copper, zinc and iron as trace elements.

A primary object of the invention is to provide a method of fertilization which enhances plant growth by varying the ratio of ammoniacal nitrogen to nitrate nitrogen in a fertilizer composition in proportion to the amount of light available to the plant.

Another object of the present invention is to provide a fertilizer kit utilized in the connection with the method which kit includes two different fertilizer compositions wherein each composition comprises a different ratio of ammoniacal nitrogen to nitrate nitrogen while maintaining the same ratio of total nitrogen to trace elements present in the composition.

An advantage of the present invention is that it allows for decreasing the total amount of fertilizer needed by varying the amounts of ammoniacal nitrogen to nitrate nitrogen over time with respect to the amount of light available to the plant, i.e., conventional fertilizer methodologies would require more fertilizer to obtain the same results or would obtain less results using the same amount of fertilizer.

Yet another advantage of the present invention is that the method allows for improved plant growth.

A feature of the present invention is that the amount of ammoniacal nitrogen to nitrate nitrogen being supplied to the plant can be varied over time with respect to the amount of light available to the plant in an efficient and easily controlled operation.

Yet another feature of the present invention is that it provides for more rapid and high quality plant growth without requiring substantial increases in the amount of labor necessary to achieve such.

Another feature of the present invention is that it does not require the use of new chemical entities which would require federal regulatory approval.

These and other objects, advantages and features of the present invention will become apparent to those persons skilled in the art upon reading the details of the fertilizer compositions and methods of use as more fully set below, reference being made to the accompanying tables and figure forming a part hereof.

BRIEF DESCRIPTION OF THE FIGURE

This invention may be better understood, and its numerous objects and advantages will become apparent to those skilled in the art, by reference to the accompanying figure as follows:

FIG. 1 is a schematic view showing a particular embodiment of an apparatus for blending fertilizer compositions and carrying out the method of the invention.

DETAILED DESCRIPTION OF PREFERRED EMBODIMENTS

Before the present method of fertilization and fertilization compositions used in connection with the method are described, it is to be understood that this invention is not limited to the particular fertilizer compositions or methods described as such compositions and methods may, of course, vary. It also to be understood that the terminology used herein is for purposes of describing particular embodiments only and is not intended to be limiting since the scope of the present invention will be limited only by the appended claims.

It must be noted that as used in this specification and in the appended claims, the singular forms "a", "an" and "the" include plural referents unless the context clearly dictates otherwise. Thus, for example, reference to "a nitrate nitrogen" includes mixtures of such nitrate nitrogen, reference to "an ammoniacal nitrogen" includes mixtures of such ammoniacal nitrogens, reference to "the method of fertilization" includes reference to various methods and steps which could be utilized in connection with this invention and so forth.

In its simplest form, the invention is a method of fertilization which enhances plant growth. The method involves varying the ratio of ammoniacal nitrogen to nitrate nitrogen being supplied to a plant in a systematic and continuous manner. More specifically, the weight ratios of the ammoniacal nitrogen to nitrate nitrogen in the composition provided to the plant is varied so that as the amount of one of the nitrogen containing fertilizers is increased the amount of the other nitrogen containing fertilizer is decreased and the amount of these increases and/or decreases are proportional to the amount of light available to the plant. Further, while the amount of these two nitrogen containing fertilizers are being varied with respect to each other based on the amount of light the fertilizer composition being provided to the plant provides a constant ratio of trace elements with respect to total nitrogen content. Accordingly, the method provides a systematic and continuous manner for providing nutrients to a plant which provides for increased plant growth during the growing season.

In a particular and very basic form of the invention, there is provided two different fertilizer formulations referred to as low-light 15-5-30 and highlight 30-5-15. The two formulas are provided within the tanks 1 and 2 as shown within FIG. 1. When a low-light formulation is required, then a higher percentage of the low-light formulation is provided to the plants. When the amount of light being provided to the plant increases, the amount of the high-light formulation is increased. The varying of the amount of the low-light formulation to the high-light formulation is gradual and continuous throughout the growing season of the plant. The ratio is varied until the maximum amount of light is being received and the maximum amount of the high-light formulation is being provided to the plant.

During early stages of plant development, low-light levels are generally present and a high level of a nitrate nitrogen fertilizer is desired. The fertilizer ratio of one part nitrogen to two parts potassium is generally used. However, when the plant has matured, it is generally receiving greater amounts of light. Accordingly, the opposite effect with respect to fertilizer formulations is desired. More specifically, the mature plant receiving high levels of light requires high levels of ammoniacal nitrogen in the fertilizer. In general, a fertilizer is utilized which includes two parts of nitrogen to one part of potassium.

In accordance with the present invention, there is a gradual change between the two extremes. That is, there is a gradual change in the fertilizer formulation between the low-light early plant development stage and the high-light mature plant development stage. This is obtained by properly manipulating the low-light 15-5-30 fertilizer and the high-light 30-5-15 fertilizer to obtain the optimum nutritional environment. In the optimum nutritional environment, the rate of plant growth is increased which is a primary object of the present invention. It is pointed out that as plants reach bud development stage, the program is shifted to the use of a finisher fertilizer formulation which utilizes a ratio of 1-3-2.

It is possible to vary the amount of the different fertilizer concentrations utilizing a variety of mechanisms which will become apparent to those skilled in the art upon reading the present disclosure and seeing the attached FIG. 1. In accordance with one embodiment, the two fertilizer formulations present within the tanks 1 and 2 are brought into solution and the flow rates from the tanks are regulated by the injectors 6 and 6'. It is possible to electrically monitor the amount of any component within the solution utilizing the electrical conductivity meters 7 and 7'. If desired, the variable injectors 6 and 6', as well as the electrical conductivity meters 7 and 7' can be connected electrically and integrated with computer software which can be specifically designed to provide the desired amount of fertilizer as well as the desired ratio of the two component fertilizers to each other over time.

In order to more precisely control the environment in which plants are grown, more and more nurseries are employing container growing techniques. By confining the plant growing medium to a container rather than growing the plants under field conditions, the plants' environment can be more precisely controlled. The conditions are controlled to achieve a more rapid an higher quality growth and a higher percentage of success in the propagation and growth of young plants. The first requirement of the growing medium is a base material which replaces the usual soil in which field-grown plants are grown. This base material is chosen from a wide assortment of organic and inorganic materials such as peat, wood chips, expanded vermiculite, expanded perlite, and like materials which provide good drainage and water-holding characteristics. An effective growing medium having good water-holding capabilities as well as drainage will insure proper oxygen delivery to the plant root structure. Such growing media are described in U.S. Pat. No. 4,067,716 which is incorporated herein by reference to disclose such growth medium.

The materials contained in the typical plant-growing base medium contain few, if any, nutrients. It is therefore necessary to supply all of the required plant growth nutrients through supplemental fertilization. The first requirement for proper fertilization is that the primary fertilizers, nitrogen, potassium and phosphorus, be supplied to the plant. The fertilizer may also contain calcium, magnesium and sulfur.

The particular ratio of nitrogen, phosphorus and potassium varies considerably according to the nature of the plant being grown, and much has been written on the desired ratios and concentrations of the primary fertilizers. However, the inventors have found that it is particularly important to plant performance that, during the growing period, the ratio of nitrate to ammoniacal nitrogen is varied in proportion to the total amount of light available to the plant ("total available light") while the total amount of nitrogen in the fertilizer composition remains constant. As more light becomes available to the plant, (artificially provided light or more light due to the earth's angle with respect to the sun) and hence plant growth accelerates, the plant requires a higher level of ammoniacal nitrogen in proportion to the amount of nitrate nitrogen.

While not wishing to be bound to any particular theory, the need for higher proportional amounts of ammoniacal nitrogen as the plant is exposed to more light is believed to occur because ammoniacal nitrogen is more readily absorbed by a rapidly growing plant, whereas nitrate nitrogen is more readily available to a plant during periods of slower growth. During periods of high total available light the ratio of ammoniacal nitrogen to nitrate nitrogen according to the present invention is preferably from about 8:1 to about 3:2, and more preferably from about 5:1 to 5:2. During periods of low total available light the ratio of ammoniacal nitrogen to nitrate nitrogen is preferably from about 1:9 to 2:3, and more preferably from 1:7 to 1:4. In a preferred embodiment of the invention the ratio of ammoniacal to nitrate nitrogen varies continuously between the preferred end points as shown below in Table 2.

The primary fertilizers generally have a high solubility, and thus leach rapidly from the growing medium. Accordingly, it is advantageous to fertilize the plant at each watering. Fertilizing with each watering facilitates the varying of the ammoniacal/nitrate ratio on a daily basis if desired.

In recent years the importance of trace elements, or micronutrients, in addition to the fertilizer base described above has been recognized. In a growing medium of the type described for container plants, it is highly important that trace elements be supplied to achieve maximum plant growth rate and plant performance as measured by bud development, plant weight, etc.

The most important micronutrients or trace minerals are iron, manganese, copper, boron, zinc, and molybdenum, with the first five being most critical. Trace elements are commercially available in various forms, such as sulfates, oxides and chelates, which have differing solubilities. Any of these forms may be used in the present invention, and it is often desirable to use different forms for different trace elements, based on availability and the properties of the individual elements. The components of fertilizers compositions can be seen below in Table 1.

Trace elements differ from the primary fertilizers in that the latitude between deficiency and toxicity is very narrow. What could be described as slightly excessive levels of any of the trace elements will stress the plant, while slight deficiencies will limit plant performance and growth. A preferred method of the present invention maintains the critical level of trace elements at all times during the growing period by fertilizing the plant at each watering as previously discussed, or at least at frequent intervals. It is thus possible to supply the level of trace elements required for a short period of time at each such fertilization.

During periods of rapid growth (i.e., when the total available light is high) the plant requires higher levels of trace elements than during periods of slower growth, and the level of the trace elements is thus advantageously increased during periods of rapid growth by the increased frequency of watering which increases the level of fertilizer supplied to the plant. It has been found that optimal plant performance is achieved when (1) the ratio of the trace elements to the total nitrogen level is maintained constant throughout the growing period; and (2) the plant is supplied with a higher level of total nitrogen and trace elements during periods of rapid growth by increasing the frequency of fertilization. The weight ratio of nitrogen to trace elements should generally be in the range of from about 2000:1 to about 500:1.

In order to ensure optimal plant performance by maintaining the critical levels of the trace elements it is preferred to keep the ratio between the individual elements constant as well as the total amount of trace elements in the fertilizer composition. For example, the ratio of boron to copper should be from about 3:2 to about 5:2, the ratio of boron to zinc from about 1:2 to 1:5, and the ratio of boron to iron from about 1:3 to 1:7. Although any ratio within these limits may be used, certain ratios are appropriate to certain plants, and the chosen ratio should be maintained throughout the growing season.

The level of the fertilizer composition which should be supplied to the plant at each fertilization varies based on the variety of plant being cultivated, and may be empirically determined by one skilled in the art. The fertilizer compositions of the invention are generally supplied in the form of dry powders, for economical and convenient shipment and storage. The fertilizer may then be supplied to the plant as a dry powder, but it is preferred that the powder be mixed with water for form an aqueous solution of the desired concentration such that the fertilizer is supplied to the plant during watering. In order to vary the ratio of ammoniacal nitrogen to nitrate nitrogen which is supplied to the plant two or more fertilizer compositions are provided which have differing ratios of ammoniacal to nitrate nitrogen. These fertilizer compositions each contain the same trace elements and have the same ratio of total nitrogen to total trace element level. These fertilizers may then be blended, either in the powder form or, preferably, as aqueous solutions, in varying ratios to provide desired ratios of ammoniacal to nitrate nitrogen, while maintaining constant the weight ratio of total nitrogen to trace elements.

In addition to nitrogen and trace elements the fertilizer compositions of the invention optionally may contain other conventional fertilizer ingredients such as phosphorus, potassium, magnesium, sulfur and calcium. Generally, the level of phosphorus is maintained constant with respect to the total level of nitrogen in the composition. Accordingly, it is possible to maintain the level of phosphorus supplied to the plant at a constant level during the growing season. However, it should be pointed out that it is generally advantageous to increase the level of phosphorus with respect to the total nitrogen level during the bud development stage.

In one embodiment of the invention two aqueous fertilizer stock solutions are provided, having differing ratios of ammoniacal to nitrate nitrogen. In a preferred embodiment the first solution comprises 10 to 20 parts by weight of nitrogen, having a ratio of ammoniacal to nitrate nitrogen of from about 1:9 to 2:3, from 2 to 10 parts phosphorus, and form 25 to 35 parts potassium, and the second solution comprises 20 to 40 parts nitrogen, having a ratio of ammoniacal to nitrate nitrogen of from about 8:1 to 3:2, from 2 to 10 parts phosphorus, and from 10 to 20 parts potassium. Preferably, the first solution further comprises from 0.15 to 0.25 weight percent total trace elements, of which from 0.010 to 0.020% is boron, from 0.0065 to 0.0095% is copper, from 0.060 to 0.090% is iron, and from 0.030 to 0.080% is zinc, and the remainder comprises other trace elements such as manganese and molybdenum, and the second solution comprises twice the level of trace elements of the first solution, with each individual element being present in twice the amount as in the first solution. Each stock solution when diluted to a concentration of 100 ppm nitrogen should contain from 1.0 to 1.6 ppm total trace elements, of which from 0.07 to 0.17 ppm is boron, from 0.030 to 0.070 ppm is copper, from 0.30 to 0.45 ppm is iron, and from 0.015 to 0.040 is zinc. The solutions may optionally further comprise magnesium and sulfur.

An advantageous means of blending two fertilizer compositions according to one embodiment of the invention is shown schematically in FIG. 1. The apparatus of FIG. 1 provides two stock tanks 1 and 2, each tank connected by pipes 3 and 3' to a water source 10 and by pipes 4 and 4' to a mixing area 8 adjacent an output line 9. In series with each stock tank, between the stock tank and the mixing area 8, is variable injectors 6 and 6' and electrical conductivity meters 7 and 7'. Water flows into the tanks 1 and 2 through pipes 3 and 3', the desired amount of each fertilizer solution contained in the stock tanks 1 and 2 is injected into the stream by each variable injector 6 and 6', the conductivity of the resulting solution (a measure of the concentration of fertilizer in the solution) is measured by each conductivity meter 7 and 7' and adjustments in the injection rate are made if necessary, and the two solutions are blended in the mixing area 8. The mixed stream then flows through the output line 9 and is supplied to the plant (not shown) or stored for subsequent use. Many other similar arrangements may be made to blend the fertilizer compositions, as will be apparent to one skilled in the art.

The following examples are provided so as to give those of ordinary skill in the art a complete disclosure and description of how to make the fertilizer compositions and carry out the fertilization methods of the invention and are not intended to limit the scope of what the inventors regard as their invention. Efforts have been made to ensure accuracy with respect to numbers used (e.g., amounts, time intervals, etc.) but some experimental errors and deviation should be accounted for. Unless indicated otherwise, parts are parts by weight, temperature is in degrees centigrade, light changes and time intervals are for typical growing seasons in the northern half of the United States and pressure is at or near atmospheric.

EXAMPLE b 1

Two fertilizer compositions were prepared having the formulations shown in Table 1 (all amounts shown in Table 1 are weight percentages based on the total weight of the formulation). Each fertilizer composition was dissolved in water at a level of two pounds fertilizer per gallon of water. The resulting two fertilizer solution were placed in stock tanks in an apparatus such as that shown in FIG. 1, and injected into the aqueous stream in varying proportions at various times during the growing period, producing fertilizer solutions of varying conductivity as shown in Table 2. (Proportions shown in Table 2 are in parts by weight.) The resulting fertilizer blends were supplied to greenhouse crops, including bedding plants, geraniums, Easter lilies, and pot mums during a complete growing period, and the plants thus fertilized showed improved vegetative growth, better flowering capacity, and were generally firmer and stronger than the same crops grown under similar conditions, but fertilized with conventional NPK fertilizers.

TABLE 1

| Composition | Fertilizer 1 | Fertilizer 2 |
|---|---|---|
| Nitrate Nitrogen | 11.6 | 4.67 |
| Ammoniacal Nitrogen | 3.45 | 25.0 |
| Phosphorus | 5.0 | 5.0 |
| Potassium | 30.0 | 15.0 |
| Magnesium | 0.633 | 0.054 |
| Sulfur | 0.823 | 0.071 |
| Boron | 0.015 | 0.030 |
| Copper | 0.0075 | 0.015 |
| Iron | 0.075 | 0.150 |
| Manganese | 0.042 | 0.084 |
| Molybdenum | 0.0075 | 0.015 |
| Zinc | 0.05 | 0.100 |

TABLE 2

| Growing Interval | Fertilizer 1 | Fertilizer 2 | Conductivity (millimhos/cm) |
|---|---|---|---|
| Dec. 21–Jan. 10 | 10 | 0 | 0.85 |
| Jan. 11–Feb. 21 | 9 | 1 | 0.73 |
| Feb. 22–Mar. 28 | 8 | 2 | 0.63 |
| Mar. 29–May 2 | 7 | 3 | 0.68 |
| May 3–June 6 | 5 | 5 | 0.40 |
| June 7–June 20 | 4 | 6 | 0.35 |
| June 21–July 4 | 4 | 6 | 0.35 |
| July 5–Aug. 8 | 5 | 5 | 0.40 |

TABLE 2-continued

| Growing Interval | Fertilizer 1 | Fertilizer 2 | Conductivity (millimhos/cm) |
|---|---|---|---|
| Aug. 9-Sept. 12 | 7 | 3 | 0.68 |
| Sept. 13-Oct. 17 | 8 | 2 | 0.63 |
| Oct. 18-Nov. 28 | 9 | 1 | 0.73 |
| Nov. 29-Dec. 20 | 10 | 0 | 0.85 |

Table 1 above shows the precise composition of two different fertilizer compositions labeled "Fertilizer 1" and "Fertilizer 2". Table 2 gives a specific example as to how the ratio of fertilizer 1 to Fertilizer 2 is varied over time from December 21 of one year through December 20 of the next year. It will be apparent to those skilled in the art, upon reading this disclosure, that the relative amount of the two fertilizer compositions may be varied at difference rates depending on factors such as the total growing season of the crops, the types of crops, the type of soil, the particular location of the crops, etcetera. However, the general concept of the present invention remains the same. More specifically, in general, the weight ratio of ammoniacal nitrogen to nitrate nitrogen is adjusted during the growing period in a systematic and continuous manner in direct proportion to the amount of light available to the plant. Further, the fertilization method maintains as a constant the ratio of the total weight of ammoniacal nitrogen and nitrate nitrogen to the total weight of trace elements in the fertilizer compositions. In connection with the data shown above, it should be pointed out the light changes are those which naturally take place in the northern half of the United States.

The instant invention is shown and described herein in what is considered to be the most practical, and preferred embodiments. It is recognized, however, that departures may be made therefrom which are within the scope of the invention, and that obvious modifications will occur to one skilled in the art upon reading this disclosure.

What is claimed is:

1. A method of enhancing the growth of a plant in a soil or soil-like growing medium during a growing period comprising:
   a) periodically adding to said growing medium during said growing period a composition comprising ammoniacal nitrogen, nitrate nitrogen, and at least one trace element to the growing medium; and
   b) adjusting during said growing period the weight ratio of ammoniacal nitrogen to nitrate nitrogen added in step a) in direct proportion to the amount of light available to the plant, while maintaining constant in said composition the ratio of the total weight of ammoniacal nitrogen and nitrate nitrogen to the weight of the trace element.

2. A method of claim 1 wherein two or more trace elements are added and the ratio of the total weight of ammoniacal nitrogen and nitrate nitrogen to the total weight of said trace elements and the weight ratio of the trace elements to each other are maintained constant.

3. A method of claim 1 further comprising blending two or more aqueous solutions, each comprising ammoniacal nitrogen, nitrate nitrogen, and at least one trace element, said solutions having differing weight ratios of ammoniacal nitrogen to nitrate nitrogen, and the same weight ratio of the ammoniacal and nitrate nitrogen to the trace element.

4. A method of claim 3 wherein the aqueous solutions are blended prior to addition to the growing medium.

5. A method of claim 3 wherein two or more trace elements are present in each solution and the ratio of the total weight of ammoniacal nitrogen and nitrate nitrogen to the total weight of said trace elements, and the weight ratio of the trace elements to each other are the same in each solutions.

6. A method of claim 1 further comprising adding magnesium to said growing medium.

7. A method of claim 1 further comprising adding potassium to said growing medium.

8. A method of claim 1 further comprising adding phosphorus to said growing medium.

9. A method of claim 8 wherein the weight percent of phosphorus added to the growing medium remains constant with respect to the total nitrogen.

10. A method of claim 8 wherein the weight percent of phosphorus added to the growing medium increases with respect to the total nitrogen during the bud development stage of the plant.

11. A method of claim 1 wherein the ration of ammoniacal nitrogen to nitrate nitrogen provided to the plant during the period of maximum available light is in the range of from about 8:1 to about 3:2.

12. A method of claim 11 wherein the ratio of ammoniacal nitrogen to nitrate nitrogen is in the range of from about 5:1 to about 5:2.

13. A method of claim 1 wherein the ratio of ammoniacal nitrogen to nitrate nitrogen provided to the plant during the period of minimum available light is in the range of from about 1:9 to about 2:3.

14. A method of claim 13 wherein the ratio of ammoniacal nitrogen to nitrate nitrogen is in the range of from about 1:7 to about 1:4.

15. A method of claim 3 wherein a first aqueous solution comprising from about 10 to about 20 total parts by weight of ammoniacal nitrogen and nitrate nitrogen, from 2 to 10 parts by weight of phosphorus, and from about 25 to about 35 parts by weight of potassium is blended with a second aqueous solution comprising from about 25 to about 35 total parts by weight of ammoniacal nitrogen and nitrate nitrogen, from about 2 to about 10 parts by weight of phosphorus, and from about 10 to about 20 parts by weight of potassium.

16. A method of claim 15 wherein the ratio of ammoniacal nitrogen to nitrate nitrogen in said first solution is from about 1:9 to about 2:3.

17. A method of claim 15 wherein the ratio of ammoniacal nitrogen to nitrate nitrogen in said second solution is from about 8:1 to about 3:2.

18. A method of claim 15 wherein said first and second solutions further comprise boron, copper, zinc and iron as trace elements, and wherein the ratio of ammoniacal nitrogen and nitrate nitrogen to the total weight of these trace elements is in the range of from about 2000:1 to about 500:1.

19. A method of claim 18 wherein the weight ratio of boron to copper is from about 3:2 to about 5:2, the weight ratio o boron to zinc is from about 1:2 to about 1:5, and the weight ratio of boron to iron is from about 1:3 to about 1:7.

* * * * *